United States Patent
Aspelin et al.

(10) Patent No.: US 6,792,882 B2
(45) Date of Patent: Sep. 21, 2004

(54) METHOD FOR FERTILIZING CULTIVATED PLANTS FOR OPTIMIZING THE QUANTITY AND QUALITY OF THE YIELD

(75) Inventors: Bengt Aspelin, Paippinen (FI); Raimo Kauppila, Helsinki (FI); Jouko Kleemola, Hyvinkää (FI); Jari Peltonen, Lahela (FI)

(73) Assignee: Kemira Agro Oy, Helsinki (FI)

( * ) Notice: Subject to any disclaimer, the term of this patent is extended or adjusted under 35 U.S.C. 154(b) by 0 days.

(21) Appl. No.: 10/149,969

(22) PCT Filed: Dec. 19, 2000

(86) PCT No.: PCT/FI00/01111

§ 371 (c)(1),
(2), (4) Date: Aug. 8, 2002

(87) PCT Pub. No.: WO01/45490

PCT Pub. Date: Jun. 28, 2001

(65) Prior Publication Data

US 2003/0101918 A1 Jun. 5, 2003

(30) Foreign Application Priority Data

Dec. 20, 1999 (FI) .............................................. 19992731

(51) Int. Cl.[7] .............................................. A01C 23/00
(52) U.S. Cl. ....................................... 111/118; 111/200
(58) Field of Search ...................... 111/118, 119, 200, 111/120, 121, 124–126; 702/2, 3; 382/109; 47/57.6, 58.1; 71/60, 61, 27, 54

(56) References Cited

U.S. PATENT DOCUMENTS 5,220,876 A 6/1993 Monson et al.
5,355,815 A 10/1994 Monson (List continued on next page.)

FOREIGN PATENT DOCUMENTS

AU 199944890 A1 3/2000
DE 19525591 A1 1/1996

(List continued on next page.)

OTHER PUBLICATIONS

Pulkkinen, J., *Leipa*, No. 5, 1999, pp 41–42.
Lantmannen, No. 12, 1990, pp. 4–7.

(List continued on next page.)

Primary Examiner—Robert E. Pezzuto
(74) Attorney, Agent, or Firm—Birch, Stewart, Kolasch & Birch, LLP

(57) ABSTRACT

The invention relates to a method for the fertilization of cultivated plants by optimizing the quantity and quality of the yield with the help of a bio-indicator, in which method, before the establishing of the plant stand, the following steps are taken:

the cultivated area is divided into sub-areas;

in each sub-area the potential yield is determined on the basis of a bio-indicator; the optimal bio-indicator level aimed at for the potential crop is selected; the nitrogen fertilization required for achieving the desired optimal level of the bio-indicator in the potential crop is determined;

and thereafter, in connection with the planting, a nitrogen fertilizer is spread, and nitrogen fertilizer is optionally spread once or several times, after the planting, according to the said fertilization requirement, the realization of the potential yield being monitored during the growing season in each sub-area by a plant stand measurement, and on the basis of these measurements additional nitrogen fertilizer is spread once or several times, according to need, in order to attain the desired bio-indicator level.

6 Claims, 1 Drawing Sheet

U.S. PATENT DOCUMENTS

| | | | | |
|---|---|---|---|---|
| 5,668,719 | A | * 9/1997 | Bobrov et al. | 702/2 |
| 5,850,620 | A | * 12/1998 | Skotnikov et al. | 702/3 |
| 5,870,689 | A | 2/1999 | Hale et al. | |
| 5,884,224 | A | 3/1999 | McNabb et al. | |
| 6,386,126 | B1 | * 5/2002 | Chamberlain et al. | 111/120 |
| 6,484,652 | B1 | * 11/2002 | Colburn, Jr. | 111/118 |
| 6,570,999 | B1 | * 5/2003 | Monson | 382/109 |

FOREIGN PATENT DOCUMENTS

| | | |
|---|---|---|
| EP | 0813807 A1 | 12/1997 |
| EP | 0843958 A1 | 5/1998 |
| FI | 102135 | 10/1998 |
| GB | 2178934 A | 2/1987 |
| WO | WO 98/21926 A1 | 5/1998 |
| WO | WO 00/04341 A2 | 1/2000 |

OTHER PUBLICATIONS

Siman, G., *Nitrogen Status in Growing Cereals...*, Diss. R. Agri. Con. Sweden, 1974, pp. 2–93.

Scaife et al., *Commun. In Soil Sci. Plant Anal.*, vol. 14, No. 9, 1983, pp. 761–777.

Wheat: *IFA World Fertilizer Use Manual*, 1992, pp. 65–92.

Wollring et al., *Variable Nitrogen Application Based on Crop Sensing*, The Internat'l. Fertiliser Soc., Proceedings No. 423, 1998, pp. 3–29.

Grandzinski et al., *Using Maps and Local Calculation Methods...*, The Internat'l. Fertiliser Soc., Proceedings No. 422, 1998, 3–27.

Watanabe et al., *Japanese Journal of Crop Science*, vol. 49, No. 1, pp. 89–92; and pp. 33–36 (1980).

* cited by examiner

METHOD FOR FERTILIZING CULTIVATED PLANTS FOR OPTIMIZING THE QUANTITY AND QUALITY OF THE YIELD

This application is the national phase under 35 U.S.C. §371 of PCT International Application No. PCT/FI00/01111 which has an International filing date of Dec. 19, 2000, which designated the United States of America.

BACKGROUND OF THE INVENTION

The invention relates to a method for fertilizing cultivated plants in order to optimize the quantity and quality of the yield by optimizing the quantity of nitrogen fertilization through the utilization of a bio-indicator of the plant. The invention is associated with the planning and implementation of an optimal fertilization method in plant cultivation.

FI patent publication 102 135 discloses a fertilization method wherein there is spread in connection with the planting of the seed an initial fertilizer amount, which is 50–75% of the fertilizer amount corresponding to the maximum yield. During the growing season, a yield prediction is calculated by heat summation, and the need for additional fertilization is calculated by means of this yield prediction. The object of this method is to achieve a maximal yield in terms of quantity. The said method is primarily a corrective method and, for example, it does not optimize the efficiency of nutrients.

Nowadays the amount of nitrogen fertilization is calculated according to the plant species and plant variety, the target yield, the properties of the soil, such as the content of organic matter in the soil, and the preceding plant species grown in the area (pioneering plant). 'Area' may here denote, according to the situation, a small area, e.g. 1 $m^2$, or a large area, e.g. 15 hectares.

In practice, the fertilizer is spread on the surface, is placed in the soil either between rows of planted seeds or between rows of seedlings, or is applied directly to the actual row of seeds or is sprayed in liquid form onto the leaves. Depending on the plant species cultivated or on the place of cultivation (agroecologic area), the fertilizer is applied either all at once or, alternatively, a portion at the time of planting and a portion according to the need to be determined during the growing season.

For the monitoring of balanced nitrogen nutrition, many laboratories are specialized in the analysis of plant and soil samples and in issuing nitrogen fertilization recommendations on the basis thereof. The making of nitrogen fertilization recommendations during the growing season is often based on the so-called DRIS method or on comparison with other known optimum curves (Anon. 1990, Beaufils 1973, Siman 1974). As a procedure, the above-mentioned practice is slow, since sending samples to the laboratory, analyzing the results, sending them back to the grower, and making the fertilizing decision on the farm take a great deal of time, during which much can change in the cultivated field.

Attempts have been made to eliminate the time problem by developing meters with which it is possible to measure the nitrogen status and nitrogen concentrations of the plant stand directly in the field. The nitrogen status of plants has been measured with color reaction papers (ammonium and nitrate nitrogen). With various portable laboratory kits it is possible to measure the nitrogen status of plants and the soil in the field under cultivation (Pulkkinen 1999). For example, portable meters have been developed for measuring the greenness, i.e. chlorophyll, of a plant stand (Watanabe et al. 1980) and the nitrate concentration in the cell sap (Scaife and Stevens 1984). These described methods do not, however, make possible a very precise, patch-specific monitoring of the nitrogen status in several parts of a field. In other words, even these methods are too laborious for patch-specific measuring of large sectors.

The latest systems include sensors installable in tractors, and growth quantity and nitrogen analyses made from aerial photographs or satellite photographs. Specifically the technology associated with the precision farming concept, which is made up of a localization system (GIS and GPS technology) and of sensors installed in production equipment such as a combine, a tractor, etc. (Wollring et al. 1998) and of yield quality meters (protein sensors, http://www.casecorp.com/agricultural), is now enabling data to be collected from very small sub-areas of a field. In practice, sub-areas of approximately 10 meters×10 meters have been handled. In addition, software has been developed for processing the patch-specific data (Grandzinski et al. 1998).

The problem in the planning of the total nitrogen amount and/or the supplementary or divided nitrogen fertilization technique during the growing season in precision farming today lies in that the nitrogen amounts are calculated for the real yield quantity on the basis of yield mapping or for a new target yield, if the productivity of the soil has changed for one reason or another. However, it is not possible to show in advance that the projected nitrogen amount would in any way be optimal under the prevailing growth conditions. In other words, the grower should be able to identify patch-specifically the yield potential for the time concerned. So far, there have been no other methods for identifying the yield potential in precision farming than to collect patch-specific yield date over several years, in which case the best possible yield level can be found through yield mapping of several years when a certain fertilizer input is used.

Because of the above-mentioned problem, for example in nitrogen fertilizer planning with the help of sensors or false-color photos during the growing season, the target is rather a uniform greenness or uniform formation of leaf area. In other words, the target is rather to homogenize the greenness of the plant stand and the formation of leaf area, and not to adapt the fertilization to the real varying yield formation potential in different patches of the field. Since it is, however, a known fact that the productivity of different patches in a field varies, and thus the total need for nitrogen fertilization also changes as productivity changes, the above-mentioned method for distributing nitrogen fertilizer during the growing season does not necessarily improve the efficiency of nitrogen fertilization and the yield in the expected manner.

Another problem is that the success of a nitrogen fertilization program implemented by the current technology cannot with certainty be verified reliably in connection with harvesting. Success could be observed experimentally by organizing in the field an experiment of increasing nitrogen fertilizer amounts (so-called fertilization windows, Anon 1992), but even this procedure is not in practice successful in precision farming. Owing to intra-sector variation, there should be an almost innumerable number of tests in different parts of the field.

SUMMARY OF THE INVENTION

The object of the invention is to provide a fertilization method by which the quantity and quality of the yield can be optimized and the nutrient load can be minimized, and by which the variations of growth among different sub-areas of the cultivated area are taken into account.

According to the invention, there is thus provided a method for fertilizing cultivated plants so that the quantity and quality of the yield are optimized with the help of a bio-indicator, in which method, before the establishment of a plant stand, the following steps are taken:

the area to be cultivated is divided into sub-areas;

the potential yield is determined in each sub-area on the basis of a bio-indicator;

the optimal bio-indicator level aimed at for the potential yield is selected; and the nitrogen fertilization requirement for achieving the desired optimal bio-indicator level in the potential yield is determined, and thereafter, in connection with the planting of the seed, nitrogen fertilizer is spread, and optionally after the planting nitrogen fertilizer is applied once or several times according to the said fertilizer requirement, the realization of the potential yield being monitored during the growing season in each sub-area by means of growth measurement, and on the basis of these measurements additional nitrogen fertilizer is applied, when needed, once or several times in order to reach the desired bio-indicator level.

According to the invention it is possible to use, for example, a fertilization method commonly used in Northern Europe, in which method most of the fertilizer is spread in connection with the planting of the seed and is supplemented with additional fertilizer according to need during the growing season. It is also possible to use the divided fertilization method prevalent in Central Europe, in which method fertilizer is spread in the field 2–7 times.

The bio-indicator used is a nitrogen-containing compound of the plant. If the cultivated plant is a grain, the said bio-indicator used is a protein. If the cultivated plant is, for example, sugar beet, the bio-indicator is an amino nitrogen (α-amino nitrogen).

The measuring of the said bio-indicator can be performed, for example, by using a sensor technique, aerial photography, or satellite photography.

According to the invention, the quantity of the yield of the growing season or of the previous growing season or of previous growing seasons and the bio-indicator level of the yield in each sub-area are taken into account in the determination of the nitrogen fertilization requirement. In this case the procedure is preferably that, at the harvesting stage a yield map and a bio-indicator map, such as a protein map, are prepared, and these maps are then used in preparing the fertilization recommendations for the subsequent growing seasons.

The invention thus relates to an entity based on the utilization, in a novel manner, of bio-indicators such as the protein content of the cultivated plant, and additionally the yield prediction derived from the leaf area and/or phytomass or the actual yield, in the making of fertilization plans. The best possible yield, i.e. the potential yield level, can be determined with precision with the help of bio-indicators. Furthermore, it is possible to take into account the natural nitrogen available in the soil; this has so far been difficult to do patch-specifically in cultivation.

In the invention, the data measured from the plant stand, for example by sensor techniques (the radiation reflected by the plant stand is measured, for example, in wavelength ranges of 600 and 800 nm) or by using the false-color techniques of aerial or satellite photographs and other patch-specific (GIS/GPS technique) data regarding the soil (soil productivity) and the yield (yield and quality maps). The measurement data are utilized in real time by using mathematical models and bio-indicators of the plant stand, by means of which fertilization to be applied during the measuring or thereafter is controlled.

The inventive idea of the method is that, before the actual fertilization recommendations are made, the crop yield potential of the plant stand is identified on the basis of a bio-indicator. When a grain is concerned, the bio-indicator used for the overall planning of fertilization is the protein content realized in the crop (post-harvest evaluation) and, respectively, for specific fertilization during the growing season the bio-indicator used is the protein content being realized, forecastable with the help of models. If the optimal protein content typical of a grain species and grain variety has been realized/is being realized, the nitrogen fertilization is correctly planned for the production conditions of that time. Instead, if the protein content is clearly higher than the determined optimal level, the crop yield has been maximized and nitrogen fertilization can be reduced, unless a high protein level is especially interesting commercially and a desirable property in the crop. Respectively, if the protein content of the crop is lower than the determined critical limit value, the yield will increase when nitrogen fertilization is increased.

BRIEF DESCRIPTION OF THE DRAWINGS

The invention is described below in greater detail with reference to the accompanying FIG. 1, which is a schematic diagram of a preferred nitrogen fertilization method according to the invention.

DESCRIPTION OF THE PREFERRED EMBODIMENT

1. Identification of the Yield Potential

Figure 1:
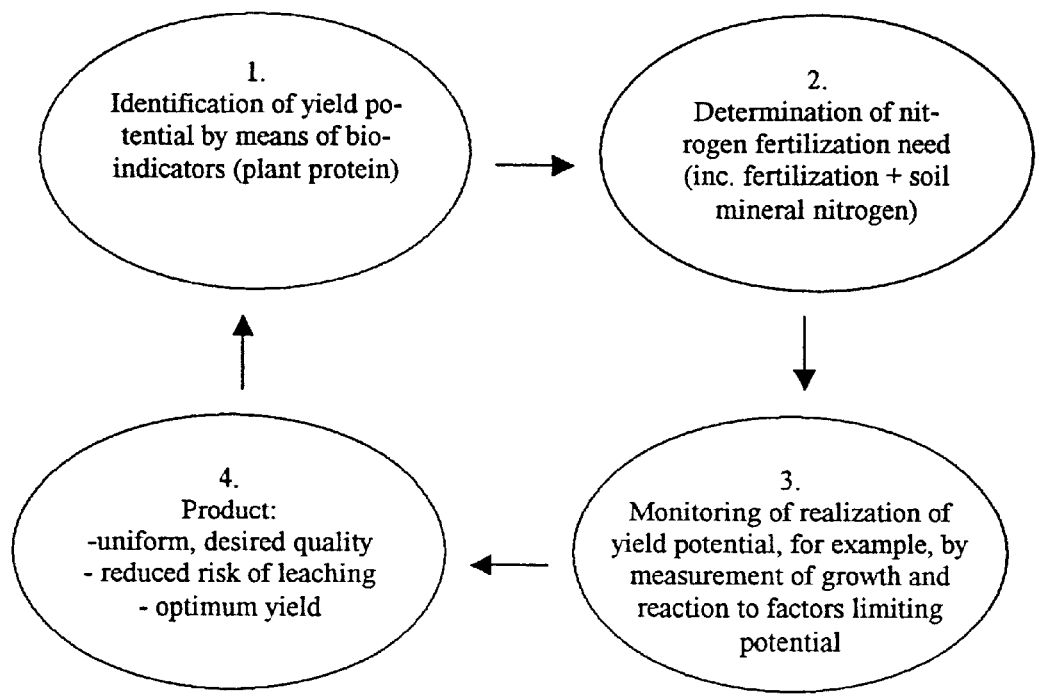

On the basis of the yield quantities and bio-indicators of nitrogen response tests carried out in different agroecologic areas (e.g. Finland, Denmark), the species- and/or variety-specific critical and optimal bio-indicator levels with respect to the relatively best yield are determined. This is done by converting the yields of each test series into relative yields by using Formula 1:

$$Yp = (Yi/Ymax * 100) \qquad (1)$$

where Yp is the proportional yield (%), Yi is the yield (kg/hectare) when N fertilizer has been added in an amount of i kg/hectare, and Ymax is the maximum yield of an individual test (kg/hectare). Thereafter, a function describing the connection between the bio-indicator level and the proportional yield (e.g. a formula having the form of Formula 2) is formed from the material.

$$Yp = 100 * (X - Xmin) / [k + (X - Xmin)] \qquad (2)$$

where X is the bio-indicator level in the grain kernels, Xmin is the maximum level that the bio-indicator may have, and k is a constant calculated from experimental material.

The patch-specific potential yield can be determined from Formula 3 as follows.

$$S_{pot} = Y + (100 - Y_p) * Y \qquad (3)$$

where Y= measured yield and $S_{pot}$ is the patch-specific potential yield.

2. Determination of the Nitrogen Fertilization Requirement

On the basis of the useful value/intended use of the crop, the bio-indicator level (cf. protein content in malting barley and bread grain) aimed at for the potential yield is selected.

The deviation of the proportional value of the yield from the proportional value of the selected bio-indicator level is calculated (Formula 2 is used). Thereafter a formula is used (e.g. having the form of Formula 4), by means of which the change in the nitrogen fertilization level compared with the nitrogen fertilization received by the yield is calculated. N0yield denotes the proportional yield obtained on average without nitrogen fertilization, m is a constant (calculated from experimental material), and N is the nitrogen fertilizer amount (kg/hectare).

$$X = N0\text{yield} + (100 - N0\text{yield}) * (1 - e^{-m*N}) \quad (4)$$

The fertilizer change requirement relative to the fertilization received by the previous crop is calculated as follows. First, X in Formula 4 is replaced with the bio-indicator level selected for the patch, and N is solved. Next, X in Formula 4 is replaced with the nitrogen fertilizer amount received by the crop, and N is again solved. The second N value calculated is subtracted from the first N value calculated, and the obtained difference is the required correction in the nitrogen fertilization as compared with that received by the crop. This method may both increase and decrease future nitrogen fertilization compared with the nitrogen fertilization of the previous crop.

The proportion of other nutrients to nitrogen and the nutrient content of the soil determine the quantities of other nutrients, e.g. phosphorus and potassium, to be used. In fertilization according to the present method, nutrients are used in such quantities that there are enough of them for growth but not in excess, so that they are not left in the environment subject to leaching.

The method described above as such optimizes the yield in accordance with the quality target set. When the yield level and also the value of the crop and the cost of fertilization are known, it is possible by the method also to optimize the financial result.

3. Monitoring of the Realization of the Yield Potential

During the growing season, the phytomass and the greenness of the leaves of the plant stand are monitored by known techniques (sensors for measuring radiation reflected by the plant stand installable in work machines, aerial photographs, satellite photographs).

During the growing season, the biomass of the plant stand is determined by measuring, for example, the radiation reflected by the plant stand. The mass of the plant stand can also be determined from an aerial photograph. The reflection values provide an estimate of the phytomass of the plant stand and the bio-indicator. The result is a measurement with which the quantity and the bio-indicator level of the future yield is predicted, on the basis of which a fertilization recommendation is made in the manner determined under heading 2.

For example, at the harvesting stage of grains, a yield map and a protein map are made using techniques known to be good for precision farming, such as yield meters and protein sensors. One usable option for the protein mapping of grains and other species is the reflection value mapping described in the previous paragraph.

4. Product

By the use of the fertilization method described above under headings 1–3, a crop is produced wherein the efficiency of nitrogen use is high, the quality fluctuations of the crop are reduced, and the financial result is improved as the yield is optimized.

EXAMPLE 1

The effect of the method according to the invention on the financial output obtained from malting barley (=value of the crop−fertilization costs).

In summer 1999 there was established in a grower's field a test with two strips approx. 10 m wide and 300 m long. Before threshing, there were taken from each strip 15 samples (2×1 row meter) at intervals of approx. 20 meters to determine the aboveground mass of the plants, the mass of the grain kernels, and the protein content of the grain kernels. On the basis of the samples it was possible to determine the financial value of the crop obtained (Table 1). On the basis of the measurements it was estimated what the value of the yield would have been if the method according to the invention had not been used. The essential point was that, according to the pre-set limit (11.75%), with the current cultivation practice the protein content of the yield was so high that it would not have been usable as malting barley. The grower is paid for malting barley approx. 0.15 FIM/kg more than for fodder barley (0.90 vs. 0.75 FIM/kg). In strip 1 the financial output would have been 25% and in strip 2 it would have been 28% higher with the use of the novel method.

TABLE 1

| | Current cultivation practice | | | | Novel method | | | |
|---|---|---|---|---|---|---|---|---|
| Strip | N fert., kg/ha | Yield, kg/ha | Gain protein % | Crop value*, FIM/ha | N fert., kg/ha | Yield kg/ha | Grain protein % | Crop value*, FIM/ha |
| 1 | 96 | 2945 | 12.6 | 2210 | 83 | 2920 | 11.5 | 2760 |
| 2 | 96 | 2410 | 13.3 | 1740 | 76 | 2380 | 11.5 | 2220 |

*On the basis of the price level of December 1999

Literature References

Anon. 1990. Rådgivarmatch i fält: resultat av växtanalysen. Lantmannen 12, 4–7.

Anon. 1992. Wheat. IFA World Fertilizer Use Manual, International Fertilizer Industry Association, Paris. pp. 65–92.

Beaufils, E. R. 1973. Diagnosis and Recommendation Integrated System (DRIS). Soil Sci. Bull. 1. Univ. Natal, South Africa.

Grandzinski, M., Van Overstraeten, M., Schröder, D. and Finch, R. 1998. Using maps and local calculation methods for spatially variable fertilizer recommendations. Proceedings No 422 of the International Fertilizer Society. 20 p.

Pulkkinen, J. 1999. Kesälannoitus avomaalla. Leipä, No 5/1999, pp. 41–42.

Scaife, A. & Stevens, K. L. 1984. Monitoring sap nitrate in vegetable crops: Comparison of test strips with electrode methods and affects of time of day and leaf position. Commun. Soil Sci. Plant Anal. 14: 761–771.

Siman, G. 1974. Nitrogen status in growing cereals with special attention to the use of plant analysis as a guide to supplemental fertilization. Diss. R. agri. Con. Sweden. 93 p.

Watanabe, S., Hatanaka, Y. & Inada, K. 1980. Development of a digital chlorophyllometer; I. Structure and performance. Jpn. J. Crop Sci. 49: 89–90.

Wolhring, J., Reusch, S. & Karisson, C. 1998. Variable rate nitrogen application based on crop sensing. Proceedings No 423 of the International Fertilizer Society. 28 p.

What is claimed is:

1. Method for the fertilization of cultivated plants by optimizing the quantity and quality of the yield with the help of a bio-indicator, characterized in that, before the establishing of a plant stand, the following steps are taken:

the cultivated area is divided into sub-areas;

in each sub-area the potential yield is determined on the basis of a bio-indicator;

the optimal bio-indicator level aimed at for the potential crop is selected;

the nitrogen fertilization required for achieving the desired optimal level of the bio-indicator in the potential crop is determined;

and thereafter, in connection with the planting of the seed, nitrogen fertilizer is spread, and nitrogen fertilizer is optionally spread once or several times, after the planting, according to the said fertilization requirement, the realization of the potential yield being monitored during the growing season in each sub-area by means of plant stand measurement, and on the basis of these measurements additional nitrogen fertilizer is spread, if required, once or several times in order to attain the desired bio-indicator level.

2. The method according to claim 1, characterized in that the cultivated plant is a grain and that the bio-indicator is a protein.

3. The method according to claim 1, characterized in that the cultivated plant is sugar beet and that the bio-indicator is amino nitrogen.

4. The method according to any of the preceding claims, characterized in that the measuring of the bio-indicator level is carried out during the growing season by using sensor techniques, aerial photography or satellite photography.

5. The method according to claim 1, characterized in that the quantity of the yield and the crop bio-indicator level in the growing season or in the preceding growing seasons are taken into account in the determination of the nitrogen fertilizer requirement in each sub-area.

6. The method according to claim 5, characterized in that at the harvesting stage there are prepared a yield map and a bio-indicator map, such as a protein map, which are used in the preparation of the fertilization recommendations for the subsequent growing seasons.

* * * * *

UNITED STATES PATENT AND TRADEMARK OFFICE
CERTIFICATE OF CORRECTION

PATENT NO. : 6,792,882 B2
DATED : September 21, 2004
INVENTOR(S) : Aspelin, Bengt et al.

It is certified that error appears in the above-identified patent and that said Letters Patent is hereby corrected as shown below:

<u>Title page,</u>
Item [73], Assignee, former Assignee name: "Kemira Agro Oy" correct assignee name:
-- Kemira GrowHow Oy --.

Signed and Sealed this

Fifteenth Day of November, 2005

JON W. DUDAS
*Director of the United States Patent and Trademark Office*